US010407098B2

(12) United States Patent
Berman et al.

(10) Patent No.: US 10,407,098 B2
(45) Date of Patent: Sep. 10, 2019

(54) REAR VEHICLE FRAME AND CENTER LONGITUDINAL FRAME MEMBER THEREFOR

(71) Applicant: Honda Motor Co., Ltd., Tokyo (JP)

(72) Inventors: Anthony R. Berman, Hilliard, OH (US); Brandon D. Koester, Marysville, OH (US); Brian T. Bautsch, Marysville, OH (US); Matthew R. Lux, Dublin, OH (US); Robb Louis Augustine, Dublin, OH (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 15/728,532

(22) Filed: Oct. 10, 2017

(65) Prior Publication Data

US 2019/0106151 A1 Apr. 11, 2019

(51) Int. Cl.
*B62D 21/15* (2006.01)
*B62D 21/02* (2006.01)
*B60K 15/03* (2006.01)

(52) U.S. Cl.
CPC .......... *B62D 21/152* (2013.01); *B62D 21/02* (2013.01); *B60K 15/03* (2013.01); *B60K 2015/03328* (2013.01); *B60Y 2306/01* (2013.01)

(58) Field of Classification Search
CPC .............................. B62D 21/152; B62D 21/02
USPC ..................... 296/187.11, 203.04, 37.1, 37.2
See application file for complete search history.

(56) References Cited

U.S. PATENT DOCUMENTS

| 5,419,609 | A | 5/1995 | Kmiec et al. |
| 7,270,365 | B2 | 9/2007 | Suzuki et al. |
| 7,429,076 | B2 | 9/2008 | Asahi et al. |
| 7,469,950 | B2 | 12/2008 | Cox et al. |
| 7,677,651 | B2 * | 3/2010 | Yamaguchi ........ B62D 25/2027 296/187.11 |
| 8,091,941 | B2 * | 1/2012 | Asou .................... B62D 21/152 296/187.11 |
| 8,118,341 | B2 | 2/2012 | Taneda |
| 8,282,146 | B2 * | 10/2012 | Izutsu .................. B62D 25/087 296/187.11 |

(Continued)

FOREIGN PATENT DOCUMENTS

| CN | 102785714 | 8/2015 |
| DE | 10062689 | 7/2002 |

(Continued)

*Primary Examiner* — Joseph D. Pape
(74) *Attorney, Agent, or Firm* — Mark E. Duell; Rankin Hill & Clark LLP

(57) ABSTRACT

A rear vehicle frame includes a first longitudinal side frame member, a second longitudinal side frame member, a storage bin, and a center longitudinal frame member. The storage bin is disposed laterally between the first and second longitudinal side frame members adjacent rear end portions of the first and second longitudinal side frame members. Lateral sides of the storage bin are respectively secured to the first and second longitudinal side frame members. The center longitudinal frame member is disposed laterally between and spaced apart from the first and second longitudinal side frame members. The center longitudinal frame member extends from a rear end of the storage bin to a forward end of the storage bin for absorbing energy in a rear crash event.

14 Claims, 3 Drawing Sheets

(56) References Cited

U.S. PATENT DOCUMENTS

2006/0087156 A1* 4/2006 Kobayashi ......... B62D 25/2027
                                                      296/203.01
2011/0227367 A1* 9/2011 Funakoshi ........... B62D 25/087
                                                      296/187.11

FOREIGN PATENT DOCUMENTS

DE   102014018315   6/2015
JP      2004322822   11/2004

* cited by examiner

REAR VEHICLE FRAME AND CENTER LONGITUDINAL FRAME MEMBER THEREFOR

BACKGROUND

Conventional frame construction in the rear of a vehicle includes the provision of two spaced apart longitudinal frame members connected at rear ends thereof by a rear bumper beam. The longitudinal frame members and the bumper beam are configured to absorb energy and protect the vehicle's fuel system from damage in the event of a rear end collision. When additional energy absorption is needed, the conventional modification is to increase the strength of the longitudinal frame members, such as by adding stiffeners and/or thickness to the longitudinal frame members. However, in some vehicle configurations wherein a shorter rear overhang is provided rearward of the rear wheels on the vehicle, the conventional modification is sometimes limited and/or not desired.

BRIEF DESCRIPTION

According to one aspect, a rear vehicle frame includes a first longitudinal side frame member, a second longitudinal side frame member, a storage bin, and a center longitudinal frame member. The storage bin is disposed laterally between the first and second longitudinal side frame members adjacent rear end portions of the first and second longitudinal side frame members. Lateral sides of the storage bin are respectively secured to the first and second longitudinal side frame members. The center longitudinal frame member is disposed laterally between and spaced apart from the first and second longitudinal side frame members. The center longitudinal frame member extends from a rear end of the storage bin to a forward end of the storage bin for absorbing energy in a rear crash event.

According to another aspect, a rear frame having a storage bin for a vehicle includes a pair of spaced apart longitudinal side frame members with the storage bin laterally disposed therebetween with lateral side walls of the storage bin respectively secured to the pair of spaced apart longitudinal side frame members. The rear frame further includes a center longitudinal frame member disposed laterally between and spaced apart from each of the pair of spaced apart longitudinal side frame members. The center longitudinal frame member extends longitudinally in a direction of travel of the vehicle from a forward wall of the storage bin to a rearward wall of the storage bin.

According to a further aspect, a center longitudinal frame member for a rear vehicle frame includes a forward longitudinal end portion disposed at or adjacent a forward end of a storage bin laterally interposed between a pair of spaced apart longitudinal side frame members of the rear vehicle frame adjacent rear end portions of the pair of spaced apart longitudinal side frame members with lateral sides of the storage bin secured to the pair of spaced apart longitudinal side frame members. The center longitudinal frame member further includes a rearward longitudinal end portion disposed at or adjacent a rearward end of the storage bin and lateral sides extending between the forward and rearward longitudinal end portions. The lateral sides are spaced apart from the pair of spaced apart longitudinal side frame members of the rear vehicle frame.

DETAILED DESCRIPTION

Figure 1:
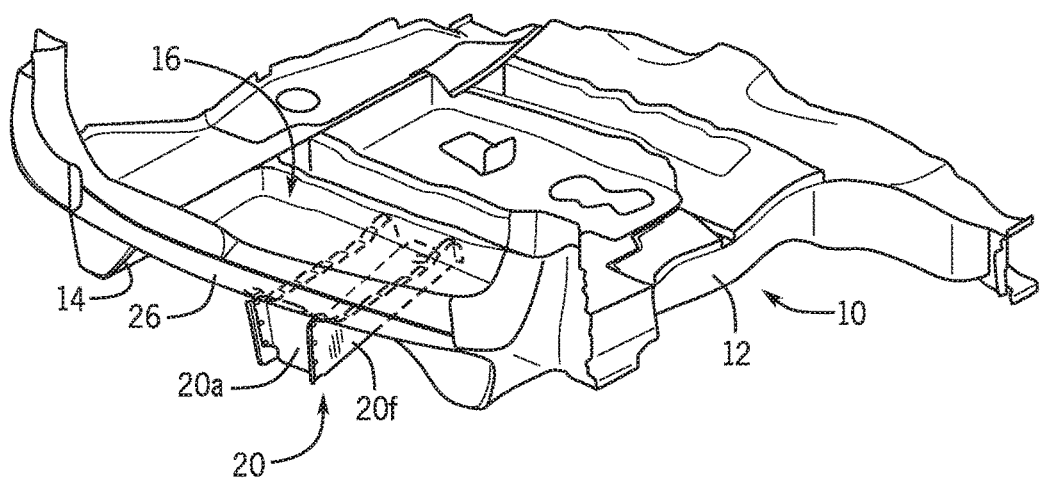
FIG. 1 is a partial perspective view of a vehicle rear frame having longitudinal side frame members, a storage bin disposed therebetween and a center longitudinal frame member according to an exemplary embodiment.

Referring now to the drawings wherein the showings are for purposes of illustrating one or more exemplary embodiments and not for purposes of limiting the same, a rear vehicle frame 10 is shown according to an exemplary embodiment. The rear vehicle frame 10 includes a pair of spaced apart longitudinal side frame members 12, 14, which particularly include first longitudinal side frame member 12 and second longitudinal side frame member 14. A storage bin 16 is disposed laterally between the first and second longitudinal side frame members 12, 14 adjacent rear end portions 12a, 14a of the first and second longitudinal side frame members 12, 14. Lateral sides 16a, 16b of the storage bin 16 are respectively secured (e.g., via welding) to the first and second longitudinal side frame members 12, 14. As shown, in one embodiment, the longitudinal side frame members 12, 14 can each be formed of a plurality of separate stamped members that are secured together (e.g., via welding) to form each of the longitudinal side frame members 12, 14. As is known and understood by those skilled in the art, the longitudinal side frame members 12, 14 have forward ends secured (e.g., via welding) to side sill frame members (neither shown).

The rear vehicle frame 10 further includes a center longitudinal frame member 20 disposed laterally in between and spaced apart from the first and second longitudinal side frame members 12, 14. As will be described in more detail below, the center longitudinal frame member 20 extends from a rear end 16c of the storage bin 16 to a forward end 16d of the storage bin 16 for absorbing energy in a rear crash event. As used herein, the terms "forward" and "rear" (or "rearward) refer generally relative to a forward direction of travel of a vehicle on which the rear vehicle frame 10 is provided. Accordingly, a forward component is located closer to a front of the vehicle than is a rear or rearward component. In the illustrated embodiment, the center longitudinal frame member 20 is formed as a single stamped member, though this is not required.

By this arrangement, the first and second longitudinal side frame members 12, 14 are provided with the storage bin 16 laterally disposed therebetween with lateral sides 16a, 16b of the storage bin 16 respectively secured to the first and second longitudinal side frame members 12, 14. As shown, the center longitudinal frame member 20 extends longitudinally in a direction of travel T of the vehicle on which the rear vehicle frame 10 is provided from a forward wall 22 of the storage bin 16 to a rearward wall 24 of the storage bin 16. As will be described in further detail below, the center longitudinal frame member 20 complementarily wraps around an underside 16e of the storage bin 16 and is secured to the storage bin 16 (e.g., via welding). Thus, in part due to this complementary wrapping and securement, the center longitudinal frame member 20 is integrated with the storage bin 16.

Figure 2:
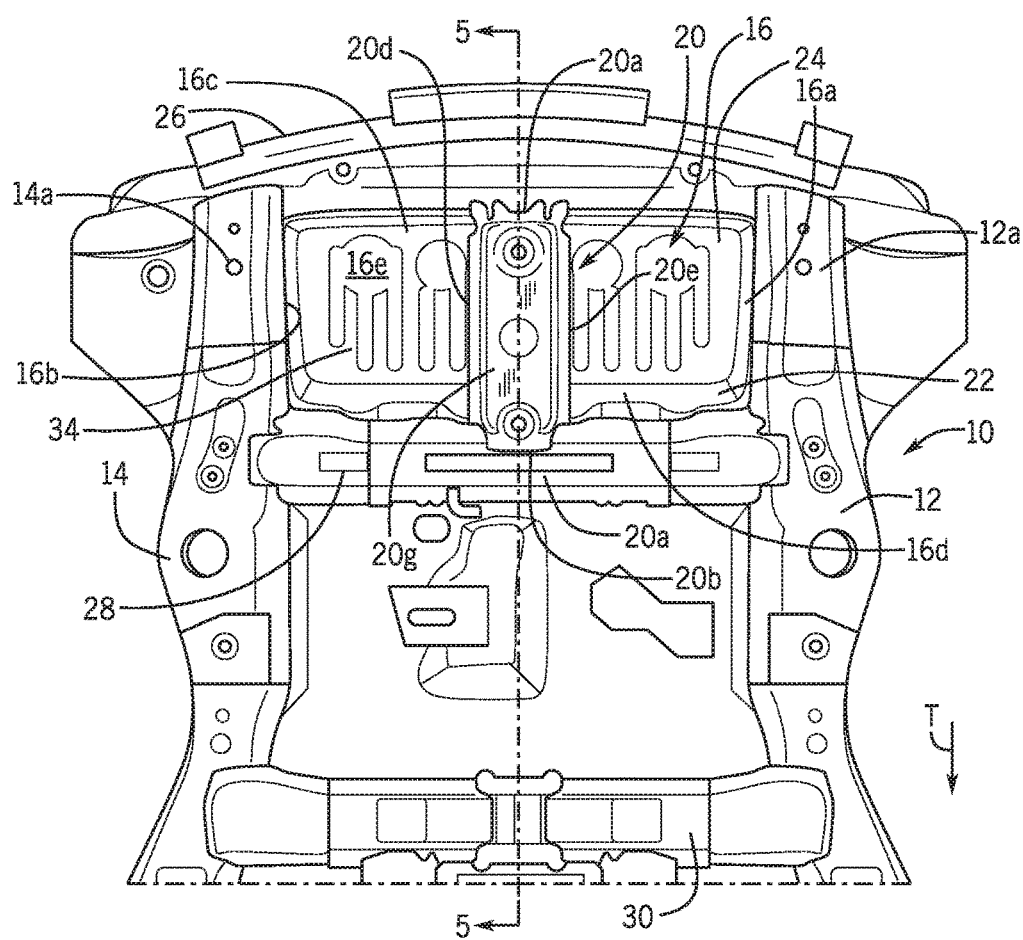
FIG. 2 is a partial underside plan view of the rear frame of FIG. 1.
Figure 3:
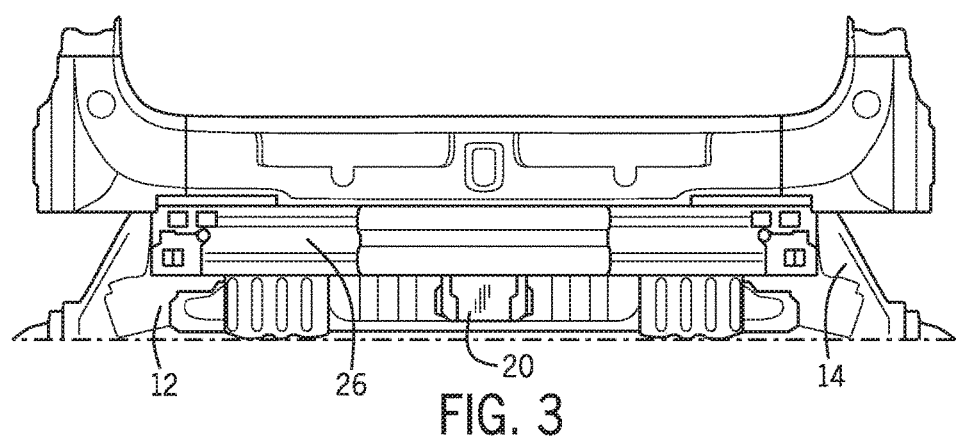
FIG. 3 is a partial rear elevation view of the rear frame of FIG. 1.
Figure 4:
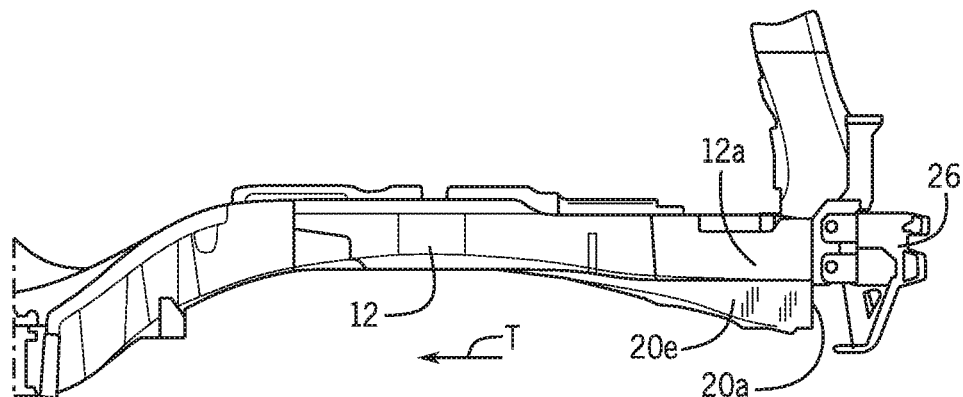
FIG. 4 is a partial side elevation view of the rear frame of FIG. 1.

Additionally, as shown in the illustrated embodiment, the rear vehicle frame 10 can also include a rear bumper beam 26 extending laterally between the rear end portions 12a, 14a of the first and second longitudinal side frame members 12, 14. In the illustrated embodiment, a rear longitudinal end or end portion 20a of the center longitudinal frame member 20 is spaced apart from the rear bumper beam 26. Also as shown, the rear bumper beam can be spaced apart from the rear end 16c of the storage bin 16. The rear bumper beam 26 can have a curved profile as shown in the illustrated embodiment (and as best shown in FIG. 2), though this is not required. The rear bumper beam 26 can be secure to the first and second longitudinal side frame member 12, 14 in any known manner, such as by welding.

Further, the rear vehicle frame 10 can include a cross member 28 extending laterally between the first and second longitudinal side frame members 12, 14. The cross member 28 is longitudinally spaced forward of the rear bumper beam 26 and is fixedly secured to the first and second longitudinal side frame members 12, 14 (e.g., via welding). As shown, the forward end 16d of the storage bin 16 can be secured to the cross member 28 (e.g., via welding). More particularly, in the illustrated embodiment, and entire lateral extent of the forward end 16d of the storage bin 16 is secured to the cross member 28. In the illustrated embodiment, the cross member 28 is a first cross member and the rear vehicle frame 10 further includes a second cross member 30 extending laterally between the first and second longitudinal side frame members 12, 14. The second cross member 30 is longitudinally spaced forward of the first cross member 28 and is fixedly secured to the first and second longitudinal side frame members 12, 14 (e.g., via welding). One or both of the first and second cross members 28, 30 can each be formed of a plurality of separate stamped members that are secured together (e.g., via welding).

The center longitudinal frame member 20 complementarily overlays the underside 16e of the storage bin 16. More specifically, the center longitudinal frame member 20 has a forward longitudinal end or end portion 20b in addition to the rearward longitudinal end portion 20a. With specific reference to FIG. 5, the rearward longitudinal end portion 20a has a rearward longitudinal end portion vertical height H1 and the forward longitudinal end portion 20b has a forward longitudinal end portion vertical height H1. The forward longitudinal end vertical height H2 is smaller than the rearward longitudinal end vertical height H1. This provides the center longitudinal frame member 20 with a triangular side profile. Also, as shown, the rearward longitudinal end portion 20a is spaced vertically below the forward longitudinal end portion 20b. Thus, the rearward longitudinal end portion 20a depends a greater extent below the storage bin 16 than does the forward longitudinal end portion 20b. Further, the rearward longitudinal end portion 20a is spaced apart vertically below the rear bumper beam 26, and particularly below a lower side 26a of the rear bumper beam 26.

Figure 5:
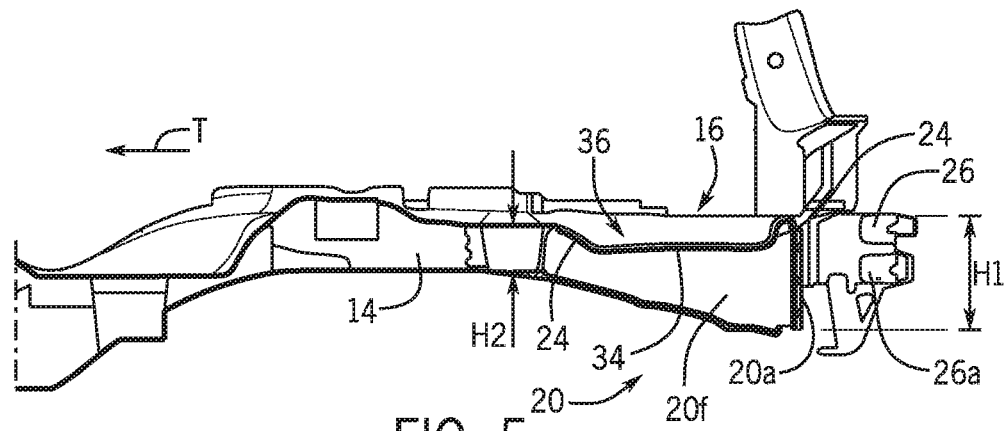
FIG. 5 is a cross-section view of the rear frame taken along the line 5-5 of FIG. 2.
Figure 6:
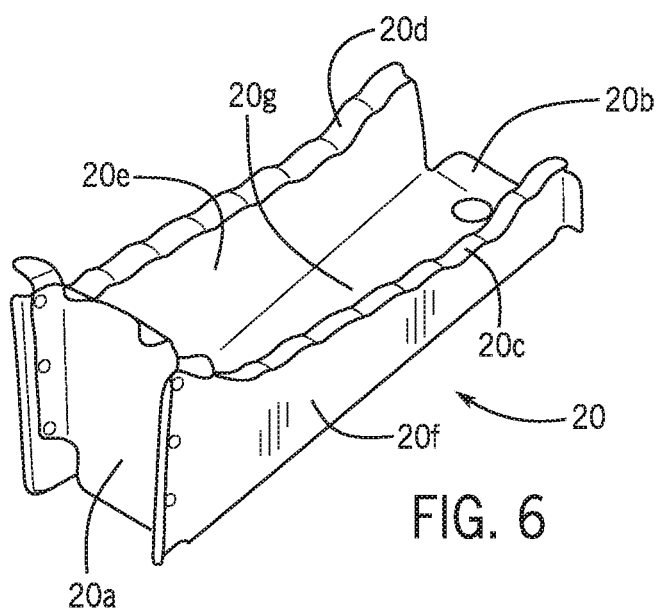
FIG. 6 is a perspective view of a center longitudinal frame member shown in isolation.

Continuing specific reference to FIG. 5, the storage bin 16 includes a bin bottom wall or wall portion 34, the forward wall 22, which can also be referred to as a bin forward wall portion 22, and the rearward wall 24, which can also be referred to as a bin rear wall portion 24. These walls or wall portions 22, 24, 34 together define a bin storage space 36 accessible from an upper side of the storage bin 16. The underside 16e of the storage bin 16 extends along each of the bin bottom wall portion 34, the bin forward wall portion 22, and the bin rearward wall portion 24 such that the center longitudinal frame member 20 complementarily overlaps the bin bottom wall portion 34, the bin forward wall portion 22, and the bin rearward wall portion 24.

In the illustrated embodiment, as best shown in FIG. 2, the center longitudinal frame member 20 includes overlapping lateral flanges (e.g., flanges 20c, 20d) that overlay the underside 16e of the storage bin 16. As shown, these lateral flanges 20c, 20d can complementarily engage the underside 16e, including the forward wall 22, the rearward wall 24 and the bin bottom wall portion 34 (i.e., the center longitudinal frame member 20 defines an upward facing recess for accommodating and complementarily receiving the storage bin). The forward longitudinal end portion 20b can be formed as a forward flange that overlaps an underside 28a of the cross member 28. Additionally, the center longitudinal frame member 20 can include laterally spaced apart side walls 20e, 20f that depend from the overlapping lateral flanges 20c, 20d and a lower wall 20g vertically spaced apart relative to and below the underside 16e of the storage bin 16 that extends laterally between the laterally spaced apart sidewalls 20e, 20f.

Advantageously, the triangular shape of the center longitudinal frame member 20 allows for increased engagement with an impacting object, such as another vehicle in a rear end collision event. Also, the center longitudinal frame member 20 allows for a reduced overhang distance relative to rear wheels (not shown) on the vehicle while providing sufficient impact absorption. Further, the center longitudinal frame member 20 allows for an overall vehicle frame package weight reduction.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A rear vehicle frame, comprising:
a first longitudinal side frame member;
a second longitudinal side frame member;
a cross member extending laterally between the first and second longitudinal side frame members;
a storage bin disposed laterally between the first and second longitudinal side frame members adjacent rear end portions of the first and second longitudinal side frame members, lateral sides of the storage bin respectively secured to the first and second longitudinal side frame members, a forward end of the storage bin is secured to the cross member; and
a center longitudinal frame member disposed laterally between and spaced apart from the first and second longitudinal side frame members, the center longitudinal frame member extending from a rear end of the storage bin to the forward end of the storage bin for absorbing energy in a rear crash event, a forward end portion of the center longitudinal frame member overlapping and secured to the cross member,
wherein the center longitudinal frame member includes laterally spaced apart side walls secured to an underside of the storage bin and a lower wall, and a lower wall of the cross member together with the lower wall of the center longitudinal frame member define a substan- tially planar surface that is angled downwardly toward the rear end of the storage bin.

2. The rear vehicle frame of claim 1 further including:
a rear bumper beam extending laterally between the rear end portions of the first and second longitudinal side frame members.

3. The rear vehicle frame of claim 2 wherein a rear longitudinal end of the center longitudinal frame member is spaced apart from the rear bumper beam.

4. The rear vehicle frame of claim 3 wherein the rear bumper beam is spaced apart from the rear end of the storage bin.

5. The rear vehicle frame of claim 2 wherein the cross member is longitudinally spaced forward of the rear bumper beam.

6. The rear vehicle frame of claim 1 wherein an entire lateral extent of the forward end of the storage bin is secured to the cross member.

7. The rear vehicle frame of claim 5 wherein the cross member is a first cross member and the rear vehicle frame further includes a second cross member extending laterally between the first and second longitudinal side frame members, the second cross member longitudinally spaced forward of the first cross member.

8. The rear vehicle frame of claim 1 wherein the center longitudinal frame member has a forward longitudinal end portion having a forward longitudinal end portion vertical height and a rearward longitudinal end portion having a rearward longitudinal end portion vertical height, and wherein the forward longitudinal end vertical height is smaller than the rearward longitudinal end vertical height.

9. The rear vehicle frame of claim 8 wherein the rearward longitudinal end portion is spaced vertically below the forward longitudinal end portion.

10. The rear vehicle frame of claim 8 wherein the rearward longitudinal end portion is spaced apart vertically below a bumper beam extending laterally between rear end portions of the first and second longitudinal side frame members.

11. The rear vehicle frame of claim 1 wherein the center longitudinal frame member complementarily overlays the underside of the storage bin.

12. The rear vehicle frame of claim 11 wherein the storage bin includes a bin bottom wall portion, a bin forward wall portion and a bin rear wall portion, which together define a bin storage space, the underside of the storage bin extending along each of the bin bottom wall portion, the bin forward wall portion and the bin rear wall portion such that the longitudinal frame member complementarily overlaps the bin bottom wall portion, the bin forward wall portion and the bin rear wall portion.

13. The rear vehicle frame of claim 11 wherein the center longitudinal frame member includes overlapping lateral flanges that overlay the underside of the storage bin, and further includes the laterally spaced apart side walls that depend from the overlapping lateral flanges and the lower wall vertically spaced apart relative to and below the underside of the storage bin that extends laterally between the laterally spaced apart side walls.

14. The rear vehicle frame of claim 1 wherein the storage bin includes a bin bottom wall portion, a bin forward wall portion and a bin rear wall portion, which together define a bin storage space, the bin forward wall portion longitudinally spaced from the cross member, the center longitudinal frame member includes laterally spaced apart side walls, and each of the side walls has an upward bulging portion received between the cross member and the bin forward wall portion.

* * * * *